(12) United States Patent
Sikri et al.

(10) Patent No.: US 8,787,509 B2
(45) Date of Patent: Jul. 22, 2014

(54) ITERATIVE INTERFERENCE CANCELLATION RECEIVER

(75) Inventors: Divaydeep Sikri, Woking (GB); Farrakh Abrishamkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 752 days.

(21) Appl. No.: 12/478,195

(22) Filed: Jun. 4, 2009

(65) Prior Publication Data
US 2010/0310026 A1 Dec. 9, 2010

(51) Int. Cl.
 H04B 1/10 (2006.01)
 H04L 25/02 (2006.01)
 H04L 25/03 (2006.01)

(52) U.S. Cl.
 CPC ...... *H04L 25/03019* (2013.01); *H04L 25/0228* (2013.01)
 USPC ........... 375/350; 375/144; 375/148; 375/285; 375/346; 375/348; 379/416

(58) Field of Classification Search
 None
 See application file for complete search history.

(56) References Cited

U.S. PATENT DOCUMENTS

| | | | |
|---|---|---|---|
| 4,718,066 A | 1/1988 | Rogard | |
| 4,885,744 A | 12/1989 | Lespagnol et al. | |
| 5,267,249 A | 11/1993 | Dong | |
| 5,710,784 A | 1/1998 | Kindred et al. | |
| 5,751,725 A | 5/1998 | Chen | |
| 5,774,450 A | 6/1998 | Harada et al. | |
| 5,774,496 A | 6/1998 | Butler et al. | |
| 5,887,035 A | 3/1999 | Molnar | |
| 5,960,361 A | 9/1999 | Chen | |
| 5,983,383 A | 11/1999 | Wolf | |
| 6,108,373 A | 8/2000 | Fargues et al. | |
| 6,169,759 B1 | 1/2001 | Kanterakis et al. | |
| 6,208,699 B1 | 3/2001 | Chen et al. | |

(Continued)

FOREIGN PATENT DOCUMENTS

| CN | 1207835 A | 2/1999 |
|---|---|---|
| CN | 1250269 A | 4/2000 |

(Continued)

OTHER PUBLICATIONS

Meyr, H. et al: "Digital Communication Receivers, Chapter 5 (Synthesis of Synchronization Algorithms), Chapter 8 (Frequency Estimation)", Jan. 1, 1998, Digital Communication Receivers; Synchronization Channel Estimation and Signal Processing; [Wiley Series in Telecommunications and Signal Processing], John Wiley and Sons, New York, pp. 271-323, 445, XP002547568, ISBN: 978-0-471-59275-3, sections 5 and 8, pp. 296, 478-479 and 487.

(Continued)

*Primary Examiner* — Adolf Dsouza
(74) *Attorney, Agent, or Firm* — Kenneth Vu; Brian Lambert (57) ABSTRACT

A method for suppressing interference in a wireless communication comprises receiving a burst of symbols, filtering the burst of symbols using an interference suppression filter with a first plurality of weights, decoding the filtered burst of symbols to generate data corresponding to the burst of symbols, encoding the data to generate a re-encoded burst of symbols, calculating a second plurality of weights for the interference suppression filter based upon the re-encoded burst of symbols, filtering the re-encoded burst of symbols using the interference suppression filter with the second plurality of weights, and decoding the filtered re-encoded burst of symbols.

37 Claims, 6 Drawing Sheets

(56) References Cited

U.S. PATENT DOCUMENTS

| | | | |
|---|---|---|---|
| 6,259,730 B1 | 7/2001 | Solondz | |
| 6,282,233 B1 | 8/2001 | Yoshida | |
| 6,285,682 B1 | 9/2001 | Proctor et al. | |
| 6,396,867 B1 | 5/2002 | Tiedemann, Jr. et al. | |
| 6,480,558 B1 | 11/2002 | Ottosson et al. | |
| 6,496,706 B1 | 12/2002 | Jou et al. | |
| 6,532,254 B1 | 3/2003 | Jokinen | |
| 6,545,989 B1 | 4/2003 | Butler | |
| 6,553,224 B1 | 4/2003 | Kim | |
| 6,587,522 B1 | 7/2003 | Wheeler et al. | |
| 6,615,030 B1 | 9/2003 | Saito et al. | |
| 6,628,707 B2 * | 9/2003 | Rafie et al. | 375/233 |
| 6,633,601 B1 | 10/2003 | Yang | |
| 6,741,661 B2 | 5/2004 | Wheatley, III et al. | |
| 6,744,814 B1 | 6/2004 | Blanksby et al. | |
| 6,747,963 B1 | 6/2004 | Park et al. | |
| 6,765,531 B2 | 7/2004 | Anderson | |
| 6,765,894 B1 | 7/2004 | Hayashi | |
| 6,771,689 B2 | 8/2004 | Solondz | |
| 6,771,934 B2 | 8/2004 | Demers et al. | |
| 6,834,197 B2 | 12/2004 | Nakahara et al. | |
| 6,907,092 B1 * | 6/2005 | Yakhnich et al. | 375/346 |
| 6,917,607 B1 | 7/2005 | Yeom et al. | |
| 6,931,030 B1 | 8/2005 | Dogan | |
| 6,956,893 B2 | 10/2005 | Frank et al. | |
| 6,959,010 B1 | 10/2005 | Bahrenburg et al. | |
| 6,975,604 B1 | 12/2005 | Ishida et al. | |
| 6,977,888 B1 | 12/2005 | Frenger et al. | |
| 6,983,166 B2 | 1/2006 | Shiu et al. | |
| 6,985,516 B1 | 1/2006 | Easton et al. | |
| 7,006,439 B2 | 2/2006 | Thron et al. | |
| 7,006,795 B2 | 2/2006 | Foschini et al. | |
| 7,013,147 B1 | 3/2006 | Kuwahara et al. | |
| 7,023,880 B2 | 4/2006 | El-Maleh et al. | |
| 7,031,742 B2 | 4/2006 | Chen et al. | |
| 7,042,869 B1 | 5/2006 | Bender | |
| 7,107,031 B2 | 9/2006 | Kristensson et al. | |
| 7,116,735 B2 | 10/2006 | Yamada et al. | |
| 7,123,590 B2 | 10/2006 | Mir et al. | |
| 7,130,365 B2 | 10/2006 | Li | |
| 7,167,502 B1 | 1/2007 | Tsaur | |
| 7,187,736 B2 | 3/2007 | Buckley et al. | |
| 7,200,172 B2 | 4/2007 | Pukkila et al. | |
| 7,224,962 B1 | 5/2007 | Kite | |
| 7,295,636 B2 | 11/2007 | Onggosanusi et al. | |
| 7,298,806 B1 | 11/2007 | Varma et al. | |
| 7,302,009 B2 | 11/2007 | Walton et al. | |
| 7,308,056 B2 | 12/2007 | Pukkila et al. | |
| 7,313,189 B2 | 12/2007 | Yoshida et al. | |
| 7,349,379 B2 | 3/2008 | Schmidl et al. | |
| 7,406,065 B2 | 7/2008 | Willenegger et al. | |
| 7,466,666 B2 | 12/2008 | Yoon et al. | |
| 7,613,144 B2 | 11/2009 | Malladi et al. | |
| 7,620,662 B2 | 11/2009 | Kassai et al. | |
| 7,630,321 B2 | 12/2009 | Jain et al. | |
| 7,693,210 B2 | 4/2010 | Margetts et al. | |
| 7,706,430 B2 | 4/2010 | Guo et al. | |
| 7,724,701 B2 | 5/2010 | Lundby et al. | |
| 7,764,726 B2 | 7/2010 | Simic et al. | |
| 7,933,256 B2 | 4/2011 | Abrishamkar et al. | |
| 8,160,002 B2 | 4/2012 | Rajkotia et al. | |
| 8,422,955 B2 | 4/2013 | Smee et al. | |
| 8,442,441 B2 | 5/2013 | Pfister et al. | |
| 8,489,128 B2 | 7/2013 | Lundby | |
| 8,594,252 B2 | 11/2013 | Black et al. | |
| 8,611,305 B2 | 12/2013 | Black et al. | |
| 8,630,602 B2 | 1/2014 | Attar et al. | |
| 2001/0018650 A1 | 8/2001 | DeJaco | |
| 2001/0021229 A1 | 9/2001 | Belaiche | |
| 2002/0006138 A1 | 1/2002 | Odenwalder | |
| 2002/0046379 A1 | 4/2002 | Miki et al. | |
| 2002/0071407 A1 | 6/2002 | Koo et al. | |
| 2002/0093937 A1 | 7/2002 | Kim et al. | |
| 2002/0131381 A1 | 9/2002 | Kim et al. | |
| 2002/0131532 A1 | 9/2002 | Chi et al. | |
| 2002/0132625 A1 | 9/2002 | Ogino et al. | |
| 2002/0181557 A1 | 12/2002 | Fujii | |
| 2003/0004784 A1 | 1/2003 | Li et al. | |
| 2003/0041206 A1 | 2/2003 | Dickie | |
| 2003/0103470 A1 | 6/2003 | Yafuso | |
| 2003/0112370 A1 | 6/2003 | Long et al. | |
| 2003/0119451 A1 | 6/2003 | Jang et al. | |
| 2003/0125037 A1 | 7/2003 | Bae et al. | |
| 2003/0134656 A1 | 7/2003 | Chang et al. | |
| 2003/0147476 A1 | 8/2003 | Ma et al. | |
| 2003/0199290 A1 | 10/2003 | Viertola | |
| 2003/0212816 A1 | 11/2003 | Bender et al. | |
| 2003/0223396 A1 | 12/2003 | Tsai et al. | |
| 2004/0001563 A1 | 1/2004 | Scarpa | |
| 2004/0005897 A1 | 1/2004 | Tomoe et al. | |
| 2004/0017311 A1 | 1/2004 | Thomas et al. | |
| 2004/0043746 A1 | 3/2004 | Hiramatsu | |
| 2004/0062302 A1 | 4/2004 | Fujii et al. | |
| 2004/0081124 A1 | 4/2004 | Black et al. | |
| 2004/0081248 A1 * | 4/2004 | Parolari | 375/259 |
| 2004/0082356 A1 | 4/2004 | Walton et al. | |
| 2004/0085917 A1 | 5/2004 | Fitton et al. | |
| 2004/0085936 A1 | 5/2004 | Gopalakrishnan et al. | |
| 2004/0116122 A1 | 6/2004 | Zeira et al. | |
| 2004/0131007 A1 | 7/2004 | Smee et al. | |
| 2004/0141525 A1 | 7/2004 | Bhushan et al. | |
| 2004/0157614 A1 | 8/2004 | Fujita et al. | |
| 2004/0160933 A1 | 8/2004 | Odenwalder et al. | |
| 2004/0168113 A1 | 8/2004 | Murata et al. | |
| 2004/0185868 A1 | 9/2004 | Jain et al. | |
| 2004/0198404 A1 | 10/2004 | Attar et al. | |
| 2004/0203913 A1 | 10/2004 | Ogino et al. | |
| 2004/0223507 A1 | 11/2004 | Kuchibhotla et al. | |
| 2004/0223538 A1 | 11/2004 | Zeira | |
| 2004/0229615 A1 | 11/2004 | Agrawal | |
| 2004/0240400 A1 | 12/2004 | Khan | |
| 2004/0240416 A1 | 12/2004 | Derryberry et al. | |
| 2005/0013263 A1 | 1/2005 | Kim et al. | |
| 2005/0018614 A1 | 1/2005 | Kiran | |
| 2005/0037718 A1 | 2/2005 | Kim et al. | |
| 2005/0053088 A1 | 3/2005 | Cheng et al. | |
| 2005/0058154 A1 | 3/2005 | Lee et al. | |
| 2005/0084045 A1 | 4/2005 | Stewart et al. | |
| 2005/0111408 A1 | 5/2005 | Skillermark et al. | |
| 2005/0147024 A1 | 7/2005 | Jung et al. | |
| 2005/0153695 A1 | 7/2005 | Cho | |
| 2005/0185364 A1 | 8/2005 | Bell et al. | |
| 2005/0232174 A1 | 10/2005 | Onggosanusi et al. | |
| 2005/0249163 A1 | 11/2005 | Kim et al. | |
| 2005/0265399 A1 | 12/2005 | El-Maleh et al. | |
| 2005/0265465 A1 | 12/2005 | Hosur et al. | |
| 2005/0277429 A1 | 12/2005 | Laroia et al. | |
| 2006/0050666 A1 | 3/2006 | Odenwalder | |
| 2006/0109938 A1 | 5/2006 | Challa et al. | |
| 2006/0126765 A1 | 6/2006 | Shin et al. | |
| 2006/0126844 A1 | 6/2006 | Mauro | |
| 2006/0141935 A1 | 6/2006 | Hou et al. | |
| 2006/0142038 A1 | 6/2006 | Ozarow et al. | |
| 2006/0146953 A1 | 7/2006 | Raghothaman et al. | |
| 2006/0146969 A1 | 7/2006 | Zhang et al. | |
| 2006/0203943 A1 | 9/2006 | Scheim et al. | |
| 2006/0209783 A1 | 9/2006 | Jain et al. | |
| 2006/0209902 A1 | 9/2006 | Grilli et al. | |
| 2006/0209982 A1 | 9/2006 | De Gaudenzi et al. | |
| 2006/0227853 A1 | 10/2006 | Liang et al. | |
| 2006/0234715 A1 | 10/2006 | Cho et al. | |
| 2007/0021148 A1 | 1/2007 | Mahini | |
| 2007/0040704 A1 | 2/2007 | Smee et al. | |
| 2007/0050189 A1 | 3/2007 | Cruz-Zeno et al. | |
| 2007/0058709 A1 | 3/2007 | Chen et al. | |
| 2007/0063897 A1 | 3/2007 | Matsuda | |
| 2007/0071145 A1 | 3/2007 | Perets | |
| 2007/0086513 A1 | 4/2007 | Fernandez-Corbaton et al. | |
| 2007/0110095 A1 | 5/2007 | Attar et al. | |
| 2007/0112564 A1 | 5/2007 | Jelinek | |
| 2007/0121554 A1 | 5/2007 | Luo et al. | |
| 2007/0121764 A1 | 5/2007 | Chen et al. | |
| 2007/0127608 A1 | 6/2007 | Scheim et al. | |
| 2007/0133423 A1 | 6/2007 | Okumura | |

(56) References Cited

U.S. PATENT DOCUMENTS

| | | |
|---|---|---|
| 2007/0133475 A1 | 6/2007 | Peisa et al. |
| 2007/0150787 A1 | 6/2007 | Kim et al. |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019308 A1 | 1/2008 | Chuan-Lin et al. |
| 2008/0019467 A1 | 1/2008 | He |
| 2008/0031368 A1 | 2/2008 | Lindoff et al. |
| 2008/0080363 A1 | 4/2008 | Black et al. |
| 2008/0080406 A1 | 4/2008 | Peplinski et al. |
| 2008/0101440 A1 | 5/2008 | Lee |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2008/0305790 A1 | 12/2008 | Wakabayashi |
| 2009/0022098 A1 | 1/2009 | Novak et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0109907 A1 | 4/2009 | Tsai et al. |
| 2009/0207944 A1 | 8/2009 | Furman et al. |
| 2009/0232052 A1 | 9/2009 | Black et al. |
| 2009/0303968 A1 | 12/2009 | Jou et al. |
| 2009/0303976 A1 | 12/2009 | Jou et al. |
| 2009/0304024 A1 | 12/2009 | Jou et al. |
| 2010/0027702 A1 | 2/2010 | Vijayan et al. |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046595 A1 | 2/2010 | Sikri et al. |
| 2010/0046660 A1 | 2/2010 | Sikri et al. |
| 2010/0046682 A1 | 2/2010 | Sikri et al. |
| 2010/0054212 A1 | 3/2010 | Tang |
| 2010/0097955 A1 | 4/2010 | Jou |
| 2010/0172383 A1 | 7/2010 | Montalvo et al. |
| 2010/0202544 A1 | 8/2010 | Osseirar et al. |
| 2010/0248666 A1 | 9/2010 | Hui et al. |
| 2010/0278227 A1 | 11/2010 | Sikri et al. |
| 2010/0296556 A1 | 11/2010 | Rave et al. |
| 2011/0051859 A1 | 3/2011 | Canpolat et al. |
| 2011/0051864 A1 | 3/2011 | Chalia et al. |
| 2011/0264976 A1 | 10/2011 | Yang et al. |
| 2011/0305303 A1 | 12/2011 | Sikri et al. |
| 2011/0312275 A1 | 12/2011 | Canpolat et al. |
| 2012/0243515 A1 | 9/2012 | Xue et al. |
| 2012/0281675 A1 | 11/2012 | Liang et al. |

FOREIGN PATENT DOCUMENTS

| | | |
|---|---|---|
| CN | 1278382 A | 12/2000 |
| CN | 1304589 A | 7/2001 |
| CN | 1394407 A | 1/2003 |
| CN | 1447549 A | 10/2003 |
| CN | 1497857 A | 5/2004 |
| CN | 1552133 A | 12/2004 |
| CN | 1736101 A | 2/2006 |
| CN | 1742457 A | 3/2006 |
| CN | 1758563 A | 4/2006 |
| CN | 1893406 A | 1/2007 |
| CN | 1906862 A | 1/2007 |
| CN | 1983913 A | 6/2007 |
| CN | 101189901 A | 5/2008 |
| CN | 101366305 A | 2/2009 |
| CN | 101465689 A | 6/2009 |
| CN | 101483499 A | 7/2009 |
| EP | 0396403 A1 | 11/1990 |
| EP | 0949766 A2 | 10/1999 |
| EP | 0969608 A2 | 1/2000 |
| EP | 1168703 A2 | 1/2002 |
| EP | 1199833 A2 | 4/2002 |
| EP | 1347611 A1 | 9/2003 |
| EP | 1398984 A1 | 3/2004 |
| EP | 1404047 A2 | 3/2004 |
| EP | 1411693 A2 | 4/2004 |
| EP | 1569399 A1 | 8/2005 |
| EP | 1643737 A1 | 4/2006 |
| EP | 1677433 A1 | 7/2006 |
| EP | 1681775 A2 | 7/2006 |
| EP | 1699194 A1 | 9/2006 |
| EP | 1699195 A1 | 9/2006 |
| EP | 1701565 A1 | 9/2006 |
| EP | 1703659 A2 | 9/2006 |
| EP | 1821497 A1 | 8/2007 |
| EP | 1928138 A2 | 6/2008 |
| GB | 2337417 | 11/1999 |
| JP | 62239735 A | 10/1987 |
| JP | 10500811 | 1/1998 |
| JP | H10327126 A | 12/1998 |
| JP | 2000059290 A | 2/2000 |
| JP | 2000261397 A | 9/2000 |
| JP | 2001036964 A | 2/2001 |
| JP | 2001078252 | 3/2001 |
| JP | 2001166026 A | 6/2001 |
| JP | 2001512916 A | 8/2001 |
| JP | 3210915 B2 | 9/2001 |
| JP | 2001257626 A | 9/2001 |
| JP | 2001267987 A | 9/2001 |
| JP | 2001519113 | 10/2001 |
| JP | 2002009741 A | 1/2002 |
| JP | 2002506583 | 2/2002 |
| JP | 2002507342 A | 3/2002 |
| JP | 2002508129 A | 3/2002 |
| JP | 2002532008 T | 9/2002 |
| JP | 2002539711 A | 11/2002 |
| JP | 2002353824 | 12/2002 |
| JP | 2003051762 A | 2/2003 |
| JP | 2003152603 A | 5/2003 |
| JP | 2003338779 A | 11/2003 |
| JP | 2004048307 A | 2/2004 |
| JP | 2004112094 A | 4/2004 |
| JP | 2004511189 A | 4/2004 |
| JP | 2004512733 A | 4/2004 |
| JP | 2004159277 A | 6/2004 |
| JP | 2004166218 A | 6/2004 |
| JP | 2004194288 A | 7/2004 |
| JP | 2004531975 A | 10/2004 |
| JP | 2004343754 A | 12/2004 |
| JP | 2005065197 A | 3/2005 |
| JP | 2005510940 A | 4/2005 |
| JP | 2006503485 A | 1/2006 |
| JP | 2006180266 A | 7/2006 |
| JP | 2006191582 A | 7/2006 |
| JP | 2006191587 A | 7/2006 |
| JP | 2006314086 A | 11/2006 |
| JP | 2007503169 A | 2/2007 |
| JP | 2007195247 A | 8/2007 |
| JP | 2007524269 A | 8/2007 |
| JP | 2008053889 A | 3/2008 |
| JP | 2008199493 A | 8/2008 |
| JP | 2008278338 A | 11/2008 |
| JP | 2008539664 A | 11/2008 |
| JP | 2009545219 A | 12/2009 |
| JP | 2011524115 A | 8/2011 |
| KR | 20010031665 | 4/2001 |
| KR | 20010085143 A | 9/2001 |
| KR | 20020092136 | 12/2002 |
| KR | 20030059528 A | 7/2003 |
| KR | 20040097893 A | 11/2004 |
| KR | 20050073113 A | 7/2005 |
| KR | 1020050097552 A | 10/2005 |
| KR | 20070091214 A | 9/2007 |
| KR | 20070104633 A | 10/2007 |
| KR | 20080039772 A | 5/2008 |
| RU | 2211531 C2 | 8/2003 |
| RU | 2233033 C2 | 7/2004 |
| RU | 2233045 C2 | 7/2004 |
| RU | 2280329 C1 | 7/2006 |
| RU | 2301493 | 6/2007 |
| RU | 2319307 C2 | 3/2008 |
| RU | 2323529 C2 | 4/2008 |

(56) References Cited

FOREIGN PATENT DOCUMENTS

| TW | 365717 | 8/1999 |
|---|---|---|
| TW | 200640202 | 11/2006 |
| TW | 200704232 | 1/2007 |
| WO | WO-9526593 | 10/1995 |
| WO | WO-9818212 | 4/1998 |
| WO | WO-9832231 A1 | 7/1998 |
| WO | 9857509 A2 | 12/1998 |
| WO | WO-9857452 A1 | 12/1998 |
| WO | 9901950 A2 | 1/1999 |
| WO | 9912273 | 3/1999 |
| WO | WO-9923844 A2 | 5/1999 |
| WO | WO-99029048 | 6/1999 |
| WO | 0035117 | 6/2000 |
| WO | WO-0033528 A1 | 6/2000 |
| WO | WO-0035126 A1 | 6/2000 |
| WO | WO0055992 A1 | 9/2000 |
| WO | WO-0062456 A1 | 10/2000 |
| WO | WO-0070786 A1 | 11/2000 |
| WO | WO-0108324 | 2/2001 |
| WO | WO-0117158 | 3/2001 |
| WO | WO-0223792 A1 | 3/2002 |
| WO | WO0232003 A1 | 4/2002 |
| WO | WO-0233877 A1 | 4/2002 |
| WO | WO02067444 A1 | 8/2002 |
| WO | WO-02103920 A2 | 12/2002 |
| WO | WO-03001834 A1 | 1/2003 |
| WO | WO-03017527 | 2/2003 |
| WO | WO-03021905 A1 | 3/2003 |
| WO | WO03047124 A1 | 6/2003 |
| WO | WO-03067783 | 8/2003 |
| WO | WO-03079577 A2 | 9/2003 |
| WO | WO-03096635 A1 | 11/2003 |
| WO | WO-03105370 A1 | 12/2003 |
| WO | 2004010573 A1 | 1/2004 |
| WO | WO-2004025869 A2 | 3/2004 |
| WO | WO-2004025986 A2 | 3/2004 |
| WO | WO-2004032369 A2 | 4/2004 |
| WO | WO2004066666 | 8/2004 |
| WO | WO-2004084480 A1 | 9/2004 |
| WO | 2004107768 A2 | 12/2004 |
| WO | WO-2004114582 A1 | 12/2004 |
| WO | WO-2005020464 A1 | 3/2005 |
| WO | WO-2005034383 A2 | 4/2005 |
| WO | WO-2005036913 A1 | 4/2005 |
| WO | 2005053177 A1 | 6/2005 |
| WO | WO-2005060192 A1 | 6/2005 |
| WO | WO-2006004948 | 1/2006 |
| WO | WO-2006071761 | 7/2006 |
| WO | WO-2006115979 A1 | 11/2006 |
| WO | WO2007000620 A1 | 1/2007 |
| WO | WO-2007016553 A1 | 2/2007 |
| WO | WO-2007024963 | 3/2007 |
| WO | WO2007029958 A1 | 3/2007 |
| WO | WO-2007053840 | 5/2007 |
| WO | WO2007060093 A1 | 5/2007 |
| WO | WO2007060229 A1 | 5/2007 |
| WO | WO-2008005890 | 1/2008 |
| WO | WO2008012265 A1 | 1/2008 |
| WO | WO-2008027192 A2 | 3/2008 |
| WO | WO-2008156061 A1 | 12/2008 |
| WO | WO-2009105611 A1 | 8/2009 |
| WO | WO2009108586 A2 | 9/2009 |
| WO | 2009140338 A2 | 11/2009 |
| WO | 2011028978 | 3/2011 |

OTHER PUBLICATIONS

International Search Report and Written Opinion of the International Searching Authority for PCT/US2010/037343, International Searching Authority—European Patent Office. Mar. 4, 2011.

3GPP Draft; 25814-150, 3rd Generation Partnership Project (3GPP), Mobile Competence Centre ; 650, Route Des Lucioles ; F-06921 Sophia-Antipolis Cedex ; France, vol. RAN WG1, no. Shanghai, China; 20060526, May 26, 2006, XP050102001 pp. 29-30 p. 76 pp. 89-90.

Huaiyu, D. et al., "Asymptotic spectral efficiency of multi cell MIMO systems with frequency-flat fading," IEEE Transactions on Signal Processing, IEEE Service Center, New York, NY, US, vol. 51, No. 11, Nov. 1, 2003, pp. 2976-2988, XP011102811.

Pais, A.V., et al., "Indoor DS-CDMA system deployment and performance with successive interference cancellation," Electronics Letters: GB, vol. 40, No. 19, Sep. 16, 2004, pp. 1200-1201, XP006022654.

Ritt: "Performance of IDMA-based inter-cell interference cancellation," 3GPP Draft TSG-RAN WG1 #44-bis Meeting, R1-060895, 3rd Generation Partnership Project (3GPP), Athens, Greece; Mar. 27, 2006, XP050101801, pp. 1-5.

Natali F D: "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.

Olivier J.C., et al., "Single antenna interference cancellation for synchronised GSM networks using a widely linear receiver" (Feb. 1, 2007) pp. 131-136, XP006028092.

Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.

Chunguang, W., et al., "Enhanced OTDOA Technology in 3G Location Service", Shanghai Research Institute of China Telecom, Shanghai 200122, China, Aug. 31, 2005.

Taiwan Search Report—TW099118215—TIPO—Jun. 11, 2013.

Xiaofa, L., "The study of Interference Cancellation based on Multi-User Detection", Chinese Scientific Papers Online, pp. 7, Mar. 27, 2008.

3rd Generation Partnership, Project 2 "3GPP2" Physical Layer Standard for cdma2000,Spread Spectrum Systems. Revision D, 3GPP2 C.S0002-D, Version 2.0, Sep. 30, 2005 (538 pages).

Chen, B.Y., et al., "Using H.264 Coded Block Patterns for Fast Inter-Mode Selection" Multimedia and Expo, 2008 IEEE International Conference on, IEEE, Piscataway, NJ, USA, Jun. 23, 2008), pp. 721-724, XP031312823 ISBN: 978-1-4244-2570-9.

Divsalar, D., et al., "Improved parallel interference cancellation for CDMA", Communications, IEEE Transactions on, Feb. 1998, vol. 46, Issue: 2, pp. 258-268.

JVT: "Draft ITU-T Recommendation and Final Draft International Standard of Joint Video Specification (ITU-T Rec. H .264 ISO/IEC 14496- 10 AVC)", 7. JVT Meeting; 64. MPEG Meeting; Jul. 3, 2003-Mar. 14, 2003; Pattaya,Th; (Joint Video Team of ISO/IEC JTC1/SC29/WG11 and ITU-T 56.16 ), No. JVT-G050r1, Mar. 14, 2003, XP030005712, ISSN: 0000-0427.

Lakkavalli, S., et al., "Stretchable Architectures for Next Generation Cellular Networks", ISART'03, Mar. 4, 2003, 7 pages.

NTT DoCoMo: "Text proposals for detailed channel coding," 3GPP TS-RAN WG1 #7, R1-99b49, Aug. 1999, pp. 24.

"Soft Handoff and Power Control in IS-95 CDMA", CDMA95.10, Dec. 6, 1999, pp. 181-212.

Tseng, S-M., et al., Fuzzy adaptive parallel interference cancellation and vector channel prediction for CDMA in fading channels, Communications, 2002. ICC 2002. IEEE International Conference on, 2002, vol. 1, pp. 252-256.

\* cited by examiner

FIG. 6

ITERATIVE INTERFERENCE CANCELLATION RECEIVER

REFERENCE TO CO-PENDING APPLICATIONS FOR PATENT

The present Application for Patent is related to co-pending U.S. patent application Ser. No. 12/038,724, entitled "COHERENT SINGLE ANTENNA INTERFERENCE CANCELLATION FOR GSM/GPRS/EDGE," filed Feb. 27, 2008, assigned to the assignee hereof, and expressly incorporated by reference herein.

The present Application for Patent is related to co-pending U.S. patent application Ser. No. 12/193,995, entitled "ENHANCED SINGLE ANTENNA INTERFERENCE CANCELLATION (ESAIC) USING CHANNEL INPUT BEAMFORMING," having filed Aug. 19, 2008, assigned to the assignee hereof, and expressly incorporated by reference herein.

BACKGROUND

1. Field

The present invention relates to wireless communication and, in particular, relates to coherent single antenna interference cancellation.

2. Background

In many communication systems utilizing GSM, GPRS, EDGE, FDMA, TDMA, CDMA or the like, a receiver's ability to properly decode a received signal depends upon the receiver's ability to maintain carrier synchronization. As wireless communications become ever more prevalent, however, increasing amounts of interference can negatively impact a receiver's ability to maintain this timing.

SUMMARY

According to one aspect of the subject technology, a method for suppressing interference in a wireless communication comprises the steps of receiving a burst of symbols, filtering the burst of symbols using an interference suppression filter with a first plurality of weights, decoding the filtered burst of symbols to generate data corresponding to the burst of symbols, encoding the data to generate a re-encoded burst of symbols, calculating a second plurality of weights for the interference suppression filter based upon the re-encoded burst of symbols, filtering the re-encoded burst of symbols using the interference suppression filter with the second plurality of weights, and decoding the filtered re-encoded burst of symbols.

According to another aspect of the subject technology, a receiver comprises an antenna configured to receive a burst of symbols, an interference suppression filter configured to filter the burst of symbols with a first plurality of weights, a decoder configured to decode the filtered burst of symbols to generate data corresponding to the burst of symbols, an encoder configured to encode the data to generate a re-encoded burst of symbols, a processor configured to calculate a second plurality of weights for the interference suppression filter based upon the re-encoded burst of symbols, the interference suppression filter configured to filter the re-encoded burst of symbols with the second plurality of weights, and the decoder configured to decode the filtered re-encoded burst of symbols.

According to yet another aspect of the subject technology, a receiver comprises means for receiving a burst of symbols, interference suppression means for filtering the burst of symbols with a first plurality of weights, decoding means for decoding the filtered burst of symbols to generate data corresponding to the burst of symbols, means for encoding the data to generate a re-encoded burst of symbols, means for calculating a second plurality of weights for the interference suppression means based upon the re-encoded burst of symbols, the interference suppression means for filtering the re-encoded burst of symbols with the second plurality of weights, and the decoding means for decoding the filtered re-encoded burst of symbols.

According to yet another aspect of the subject technology, a machine-readable medium comprises instructions for suppressing interference in a wireless communication. The instructions comprising code for receiving a burst of symbols, filtering the burst of symbols using an interference suppression filter with a first plurality of weights, decoding the filtered burst of symbols to generate data corresponding to the burst of symbols, encoding the data to generate a re-encoded burst of symbols, calculating a second plurality of weights for the interference suppression filter based upon the re-encoded burst of symbols, filtering the re-encoded burst of symbols using the interference suppression filter with the second plurality of weights, and decoding the filtered re-encoded burst of symbols.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
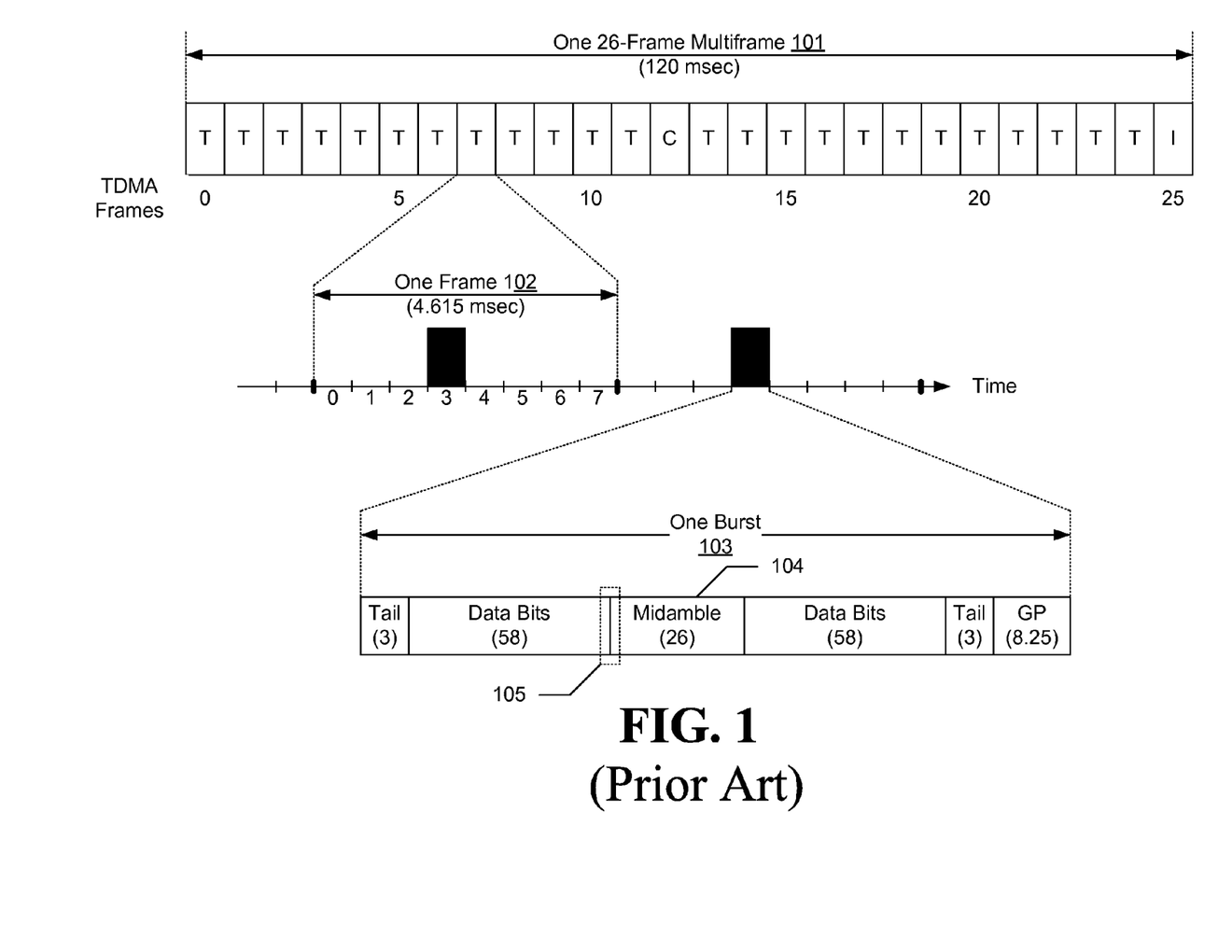
FIG. 1 illustrates exemplary frame and burst formats in GSM in accordance with one aspect of the subject technology.

FIG. 1 shows exemplary frame and burst formats in GSM. The timeline for downlink transmission is divided into multiframes. For traffic channels used to send user-specific data, each multiframe, such as exemplary multiframe 101, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 1. A control channel, identified by the letter "C," is sent in TDMA frame 12. No data is sent in the idle TDMA frame 25 (identified by the letter "T"), which is used by the wireless devices to make measurements for neighbor base stations.

Each TDMA frame, such as exemplary TDMA frame 102, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 103, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 104, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

One approach to locating a midamble in a burst of symbols serially compares hypotheses regarding the midamble position to determine which hypothesis provides the highest correlation energy between the known midamble sequence and the hypothesized position in the burst of symbols. This method is very sensitive to interference from multi-paths of the same midamble sequence, which can cause the correlation energy of inaccurate hypotheses to be affected by time-delayed copies thereof.

Figure 2:
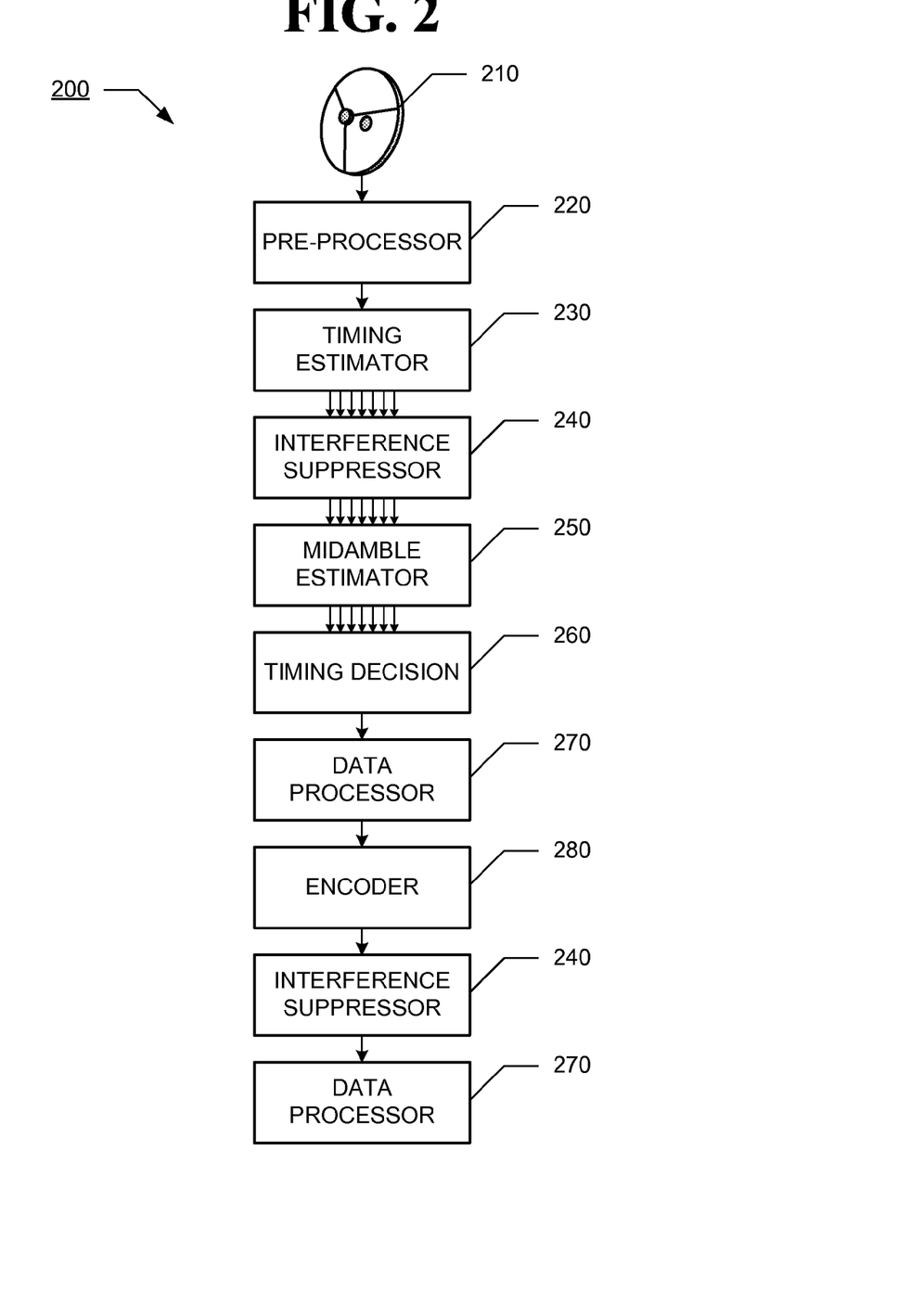
FIG. 2 illustrates a receiver for use in a wireless communication system in accordance with one aspect of the subject technology.

FIG. 2 illustrates a receiver for use in a wireless communication system in accordance with one aspect of the subject technology. Receiver 200 includes an antenna 210 configured to receive a wireless signal. While receiver 200 may be used in various communication systems, for clarity, receiver 200 is specifically described herein with respect to a GSM system. The received signal is provided to a pre-processor 220 which demodulates the signal to generate received samples. Pre-processor 220 may include a GMSK-to-BPSK rotator that performs phase rotation on the received samples. Timing estimator 230 receives the samples from pre-processor 220 and makes several hypotheses regarding where a training sequence of symbols (i.e., midamble) begins in the burst of data, to provide several hypothetical channel estimates. Interference suppressor 240 performs single antenna interference cancellation on each of the hypothesized channels, and midamble estimator 250 generates a midamble estimation error for each hypothesis. Timing decision circuit 260 compares the midamble estimation errors for each hypothesis and selects the hypothesis with the lowest midamble estimation error. The selection of a hypothesis by timing decision circuit 260 represents the position in the burst of symbols where the midamble is estimated to begin. Utilizing the selected timing hypothesis, the received samples are provided to interference suppressor 240, which re-calculates training weights based upon the entire burst of received samples and filters the entire burst. The filtered signal is then provided to data processor 270, which decodes the received symbols based upon the selected timing hypothesis, and outputs the data corresponding to the received symbols. The decoding process may employ any one of a number of error correction schemes known to those of skill in the art to reduce decoding errors and to provide accurate decoded data. The decoded data is provided to an encoder 280, which re-encodes the data to provide a re-encoded burst of symbols, which are used by interference suppressor 240 to re-calculate training weights based upon the re-encoded burst of symbols and then filters the re-encoded burst of symbols using the re-calculated weights. The filtered signal is then provided to data processor 270, which decodes the received symbols based upon the selected timing hypothesis, and outputs the data corresponding to the received symbols.

Accurate time synchronization may be achieved either non-coherently (e.g., through selection of the maximum correlation energy sum) or coherently, by performing interference suppression to provide an estimate of the symbols making up the training sequence, which can be compared against the previously-known symbols of that training sequence to determine an estimation error therefor.

To begin the search for the first midamble symbol, timing estimator 230 opens a "window" around the estimated beginning of the midamble sequence. The position of the first symbol of the midamble sequence can be estimated for a given burst, based upon the known structure of each burst. For example, as illustrated in FIG. 1, the beginning of midamble 104 in burst 103 begins in the 62nd bit of the burst. Based upon this known structure, timing estimator 230 selects a window 105 of bits representing a series of hypotheses regarding where the first midamble symbol may be located. Exemplary window 105 is illustrated in greater detail in FIG. 3.

Figure 3:
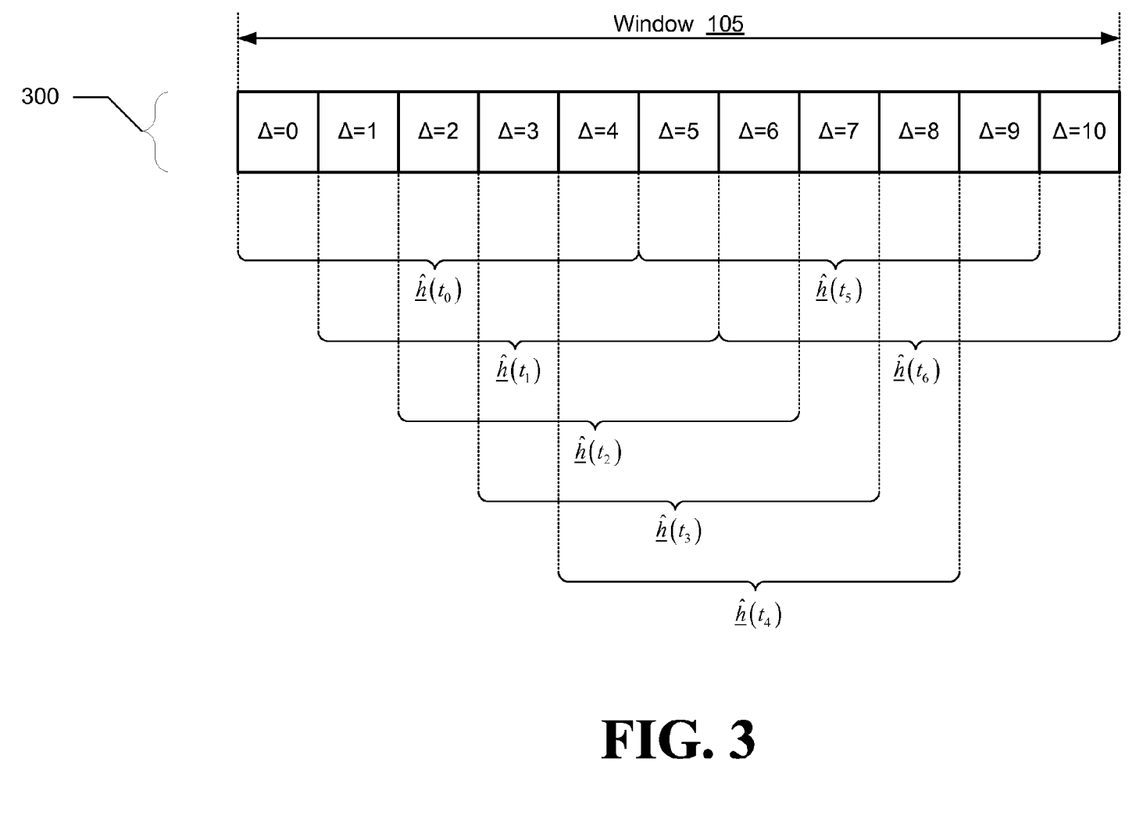
FIG. 3 illustrates a subset of symbols, including the first midamble symbol, that a receiver selects in accordance with one aspect of the subject technology.

As can be seen with reference to FIG. 3, exemplary window 105 comprises 11 symbols, labeled $\Delta=0$ to $\Delta=10$. Each $\Delta$ value represents the position of the symbol in the window. With reference to the position of a symbol in the entire burst, however, the $\Delta$ value is offset by an offset value (e.g., $\Delta=5$ may be offset by 61 to represent the position of this symbol in the entire burst). For the first seven symbols in window 105, timing estimator 230 generates a channel estimate from a sequence of five contiguous symbols (representing the five-tap channel format of GSM). For example, symbol $\Delta=0$ corresponds to channel estimate $\hat{\underline{h}}(t_0)$, symbol $\Delta=1$ corresponds to channel estimate $\hat{\underline{h}}(t_1)$, etc. Each of these channel estimates is then processed by interference suppressor 240 and midamble estimator 250 to determine estimated midamble symbols corresponding thereto, in order to determine a midamble estimation error therefor.

While in the present exemplary aspect, window 105 has been illustrated as consisting of exactly 11 symbols, the scope of the present invention is not limited to such an arrangement. Rather, as will be readily apparent to one of skill in the art, any window size (up to the size of the entire data burst) may be selected. For example, in accordance with one aspect of the subject technology, the size of the search window may be chosen to be twice the size of the expected minimum propagation delay. Alternatively, the search window size may be parameterized based on any other metric known to those of skill in the art.

According to one aspect, a channel estimate $\hat{\underline{h}}$ is generated by timing estimator 230 by correlating the received samples (corresponding to the hypothesized delay) with the reference samples (i.e., the known midamble sequence) for each hypothesis. Based on the correlation $R_{ys}(\Delta)$ between received signal y and midamble sequence s for a hypothesized delay $\Delta$, the channel estimate may be calculated as follows:

$$h^{(\delta)} = [R_{ys}(\delta), R_{ys}(\delta+1), \ldots, R_{ys}(\delta+4)] \text{ for } \delta = 0, 1, \ldots, 6 \quad (1)$$

$$\delta^* = \underset{\delta}{\arg\max}\{\|h_1^{(\delta)}\|^2\} \quad (2)$$

$$\hat{h} = [R_{ys}(\delta^*), R_{ys}(\delta^*+1) \ldots R_{ys}(\delta^*+4)]. \quad (3)$$

To test the hypothesis corresponding to each channel estimate, interference suppressor 240 performs single antenna interference cancellation ("SAIC") on each estimated channel. SAIC is a method by which oversampled and/or real/imaginary decomposition of a signal is used to provide virtual antennas with separate sample sequences, such that weights may be applied to the virtual antennas to form a beam in the direction of a desired transmitter and a beam null in the direction of an undesired interference source. In general, SAIC may be achieved with one or multiple actual antennas at the receiver by using space-time processing, where "space" may be virtually achieved with inphase and quadrature components, and "time" may be achieved using late and early samples.

For example, given a set of spatial and temporal samples $x_1(k)$ at times $k=1 \ldots M$, where:

$$\underline{x}_k = \begin{bmatrix} x_k(1) \\ x_k(2) \\ \vdots \\ x_k(M) \end{bmatrix}, \underline{s}_k = \begin{bmatrix} s_k \\ s_{k-1} \\ \vdots \\ s_{k-\upsilon} \end{bmatrix}$$

where $s_k$ is the midamble/quasi-midamble signal at time k, $\underline{s}_k$ is a $(\upsilon+1) \times 1$ midamble/quasi-midamble vector, and $\underline{x}_k$ is a $M \times 1$ received midamble/quasi-midamble vector, a set of spatial temporal samples can be defined as $$X_k = \begin{bmatrix} \underline{x}_k \\ \underline{x}_{k-1} \\ \vdots \\ \underline{x}_{k-L} \end{bmatrix},$$

where $X_k$ is a $M \times (L+1) \times 1$ vector of spatial temporal samples with a spatial length of M and a temporal length of L+1. Accordingly, a spatial/temporal structured matrix can be constructed, such that $$[X] = [X_k X_{k+1} \ldots X_{k+p-\upsilon}],$$

where [X] is a $M(L+1) \times p-\upsilon$ matrix, and p is the length of the midamble or quasi-midamble (data aided).

Accordingly, given [X] and $\underline{\tilde{s}}_k = [\underline{s}_k, \underline{s}_{k+1}, \ldots \underline{s}_{k+p-\upsilon}], (\upsilon+1) \times p-\upsilon$, a suppression filter $W_{SAIC}$ can be computed according to one aspect of the subject disclosure by estimating a reference sequence of symbols at the channel output:

$$W_{SAIC} = \arg\min \|W[X] - \tilde{Z}\|^2 \quad (4)$$

where $W = (\upsilon+1) \times M(L+1)$ and $\tilde{Z}$ is equal to either $\underline{\tilde{s}}_k, (\upsilon+1) \times (p-\upsilon)$ or $H\underline{\tilde{s}}_k, (M) \times (p-\upsilon)$, where $$H = \begin{bmatrix} h_{10} & h_{11} & \ldots & h_{1\upsilon} \\ h_{20} & h_{21} & \ldots & h_{2\upsilon} \\ \vdots & \vdots & \ddots & \vdots \\ h_{M0} & h_{M1} & \ldots & h_{M\upsilon} \end{bmatrix}.$$

The foregoing equation can be rewritten as $$W_{SAIC} = \tilde{Z}[X]^\dagger, (\upsilon+1) \times M(L+1). \quad (5)$$

The output of interference suppressor 240 is in the form $\hat{S}$, where $\hat{S}$ represents an estimate of the midamble sequence. The difference between the estimated and known midamble sequences is determined according to Equation 6, below:

$$\|S - \hat{S}\|^2 = e_m(t_i) \quad (6)$$

to obtain a midamble estimation error $e_m(t_i)$ for each time $t_i$. Each time $t_i$ is equal to the hypothesized position $\Delta_i$ plus an offset $T_s$ from the beginning of the burst:

$$t_i = \Delta_i + T_s \quad (7)$$

Once the midamble estimation error $e_m(t_i)$ for each time $t_i$ is determined, timing decision block 260 determines which hypothesis corresponds to the lowest estimation error $e_m$, and the other hypothesized timing values are discarded.

Utilizing the selected timing hypothesis, the received samples are provided to interference suppressor 240, which re-calculates training weights based upon the entire burst of received samples and filters the entire burst. The filtered signal is then provided to data processor 270, which decodes the received symbols based upon the selected timing hypothesis, and outputs the data corresponding to the received symbols. The decoding process may employ any one of a number of error correction schemes known to those of skill in the art to reduce decoding errors and to provide accurate decoded data. The decoded data is provided to an encoder 280, which re-encodes the data to provide a re-encoded burst of symbols, which are used by interference suppressor 240 to re-calculate training weights based upon the re-encoded burst of symbols and then filters the re-encoded burst of symbols using the re-calculated weights. The filtered signal is then provided to data processor 270, which decodes the received symbols based upon the selected timing hypothesis, and outputs the data corresponding to the received symbols.

For example, in accordance with one aspect of the subject disclosure, a Full Rate channel (e.g., TCH/FS, as defined in 3GPP standards), may have a packet size of 260 bits (e.g., 182 class 1 bits and 78 class 2 bits). The class 1 bits are convolutionally encoded with code rate=1/2. Before encoding, CRC may be applied to 50 bits of Class 1 bits (known as Class 1a) which are then convolutionally encoded using cyclic degenerate code the polynomial generator $g(D)=1+D+D^3$. Following encoding and subsequent puncturing (depending on channel), a message block of 456 bits is interleaved over 8 successive frames and then modulated, and transmitted. Iterating between message decoding and burst equalization combines the benefits of the interleaver (which makes the error uniformly distributed, allowing error correction channel codes to work best) and the channel coding present on class 1 bits, thereby providing a better reference sample for blind interference cancellation, as set forth in greater detail above.

According to one aspect of the subject disclosure, the interference suppression filter used to filter the re-encoded burst of symbols may utilize a higher-order model than is used to filter the burst of symbols in the first iteration, as the reduction of signal noise accomplished by decoding (with error correction) the previously-filtered signal allows for a higher-order model (e.g., a model with increased temporal order L) with better curve fitting to be utilized.

According to one aspect of the subject disclosure, data processor 270 comprises a soft output generator that receives the signal from timing decision block 260 and generates soft decisions that indicate the confidence in the detected bits. A soft output generator may implement an Ono algorithm, as is well known to those of skill in the art. Data processor 270 may further comprise a de-interleaver that de-interleaves the soft decisions, and passes the soft decisions to a Viterbi decoder that decodes the deinterleaved soft decisions and outputs decoded data.

Figure 4:
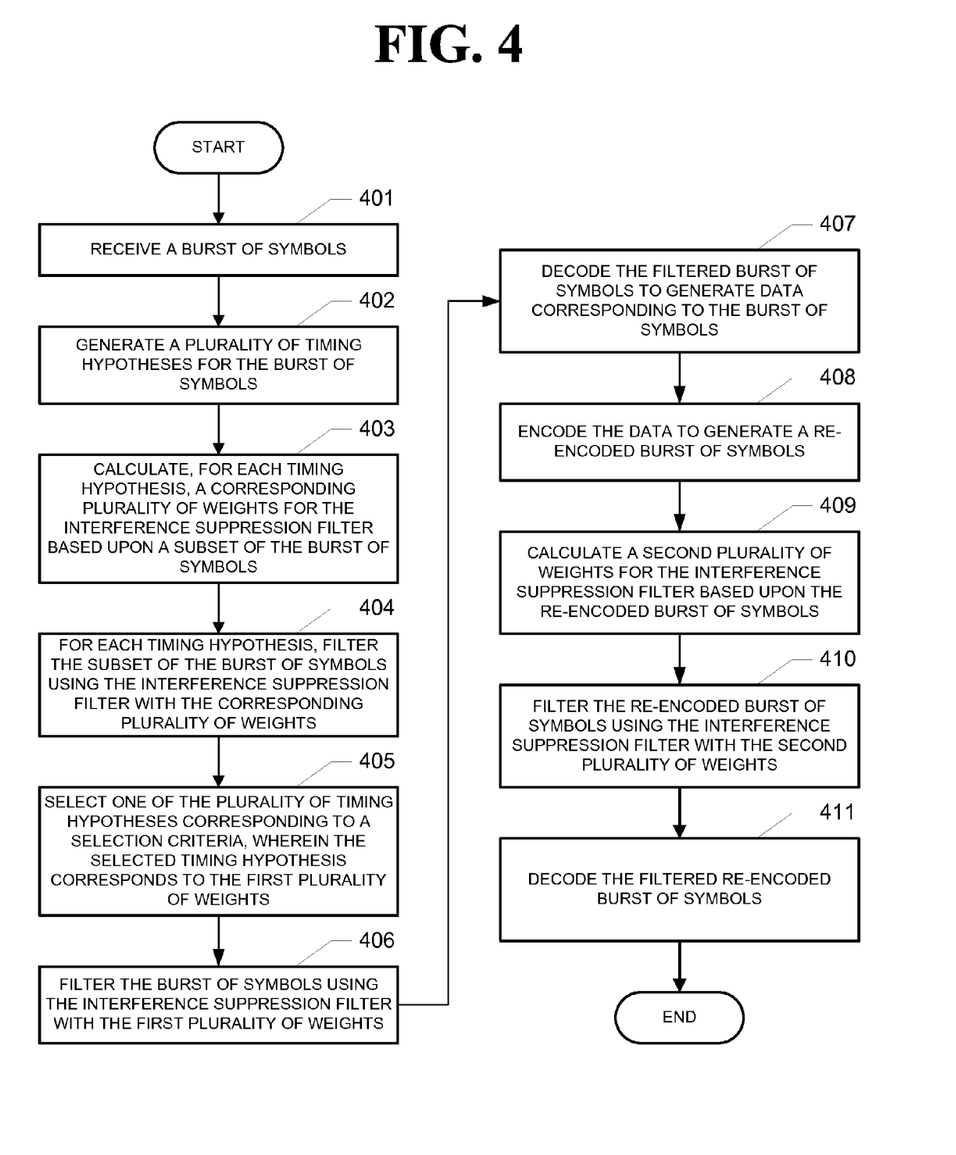
FIG. 4 illustrates a method for suppressing interference in accordance with one aspect of the subject technology.

FIG. 4 is a flow chart illustrating a method for interference suppression in accordance with one aspect of the subject technology. The method begins with step 401, in which a burst of symbols are received. In step 402, a plurality of timing hypotheses are generated for the burst of symbols. In step 403, the receiver calculates, for each timing hypothesis, a plurality of weights for an interference suppression filter based upon a subset of the burst of symbols. For each timing hypothesis, the subset of the burst of symbols is filtered by the interference suppression filter with the corresponding first plurality of weights in step 404. In step 405, one of the plurality of timing hypotheses corresponding to a selection criteria is selected. The selection criteria may be, for example, a midamble estimation error. In step 406, the burst of symbols are filtered using the interference suppression filter with the first plurality of weights. In step 407, the filtered burst of symbols are decoded to generate data corresponding to the burst of symbols. The decoder may implement any one of a number of error correction procedures known to those of skill in the art. In step 408, the decoded data is re-encoded to generate a re-encoded burst of symbols, which are then iteratively processed in steps 409 to 411. First, a second plurality of weights are calculated for the interference suppression filter in step 409, based upon the re-encoded burst of symbols. Then, in step 410, the re-encoded burst of symbols are filtered using the interference suppression filter with the second plurality of weights. In step 411, the filtered re-encoded burst of symbols are decoded again.

Figure 5:
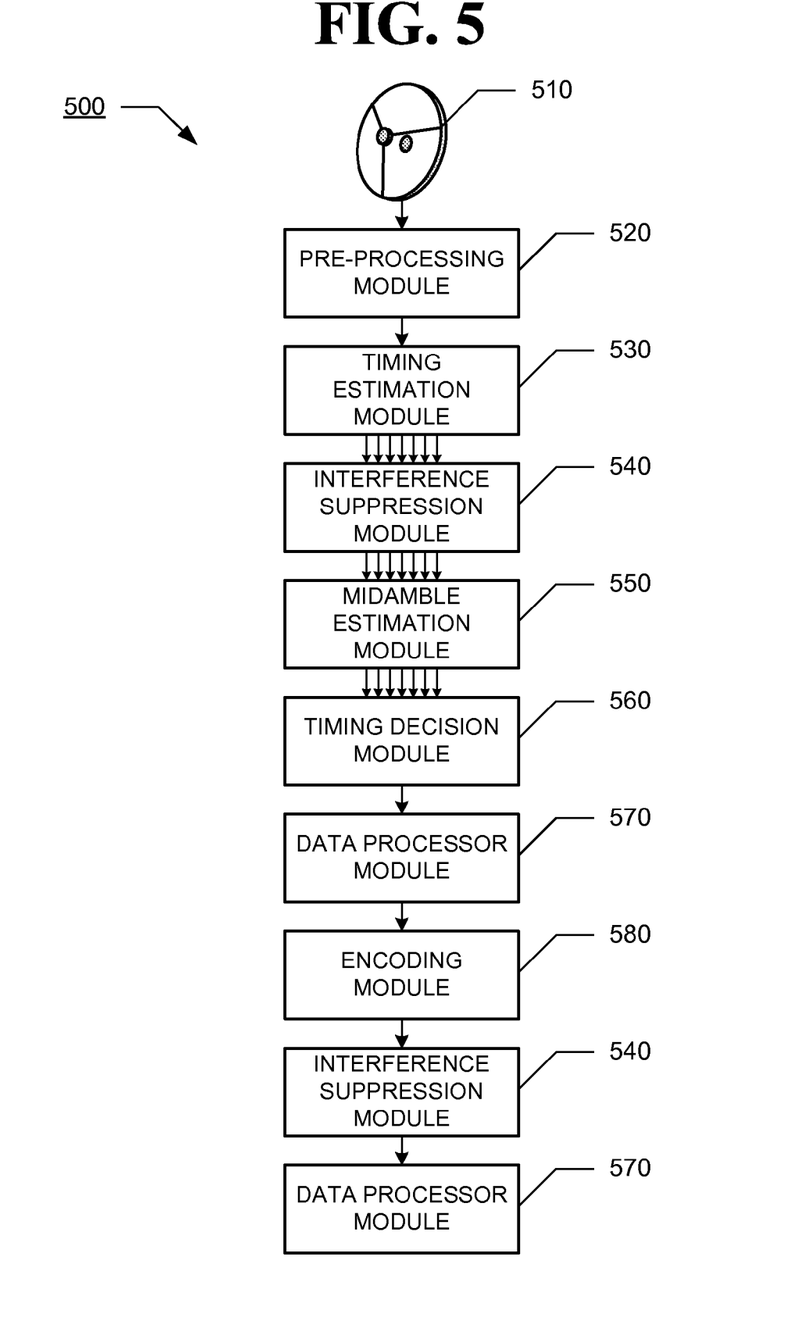
FIG. 5 illustrates a receiver for use in a wireless communication system in accordance with one aspect of the subject technology.

FIG. 5 illustrates a receiver for use in a wireless communication system in accordance with one aspect of the subject technology. Receiver 500 includes an antenna module 510 configured to receive a wireless signal such as, for example, an RF modulated GSM signal. The received signal is provided to a pre-processor module 520 which demodulates the signal to generate received samples. Pre-processor module 520 may also include a GMSK-to-BPSK rotator that performs phase rotation on the received samples. Timing estimation module 530 receives the samples from pre-processing module 520 and makes several hypotheses regarding where a training sequence of symbols (midamble) begins in the burst of data, to provide several hypothetical channel estimates. Interference suppression module 540 performs single antenna interference cancellation by calculating a plurality of filter weights for each hypothesis and then applying the filter, with the calculated weights, to each channel estimate hypothesis. Midamble estimation module 550 generates a midamble estimation error for each hypothesis, and timing decision module 560 compares the midamble estimation errors for each hypothesis and selects the hypothesis with the lowest midamble estimation error. The selection of a hypothesis by timing decision module 560 represents the position in the burst of symbols where the midamble is estimated to begin. Utilizing the selected timing hypothesis, the received samples are provided to interference suppressor module 540, which re-calculates training weights based upon the entire burst of received samples and filters the entire burst. The filtered signal is then provided to data processor module 570, which processes the received symbols based upon the selected timing hypothesis, and outputs the data corresponding to the received symbols.

While in the foregoing exemplary embodiments, the interference suppression filter has been described as a single antenna interference cancellation filter, the scope of the present invention is not limited to such an embodiment. Rather, as will be apparent to those of skill in the art, the subject technology has application to systems with more than one antenna, which may perform, for example, dual antenna interference cancellation ("DAIC"), or any other multiple-antenna interference cancellation method, well known to those in the art.

Figure 6:
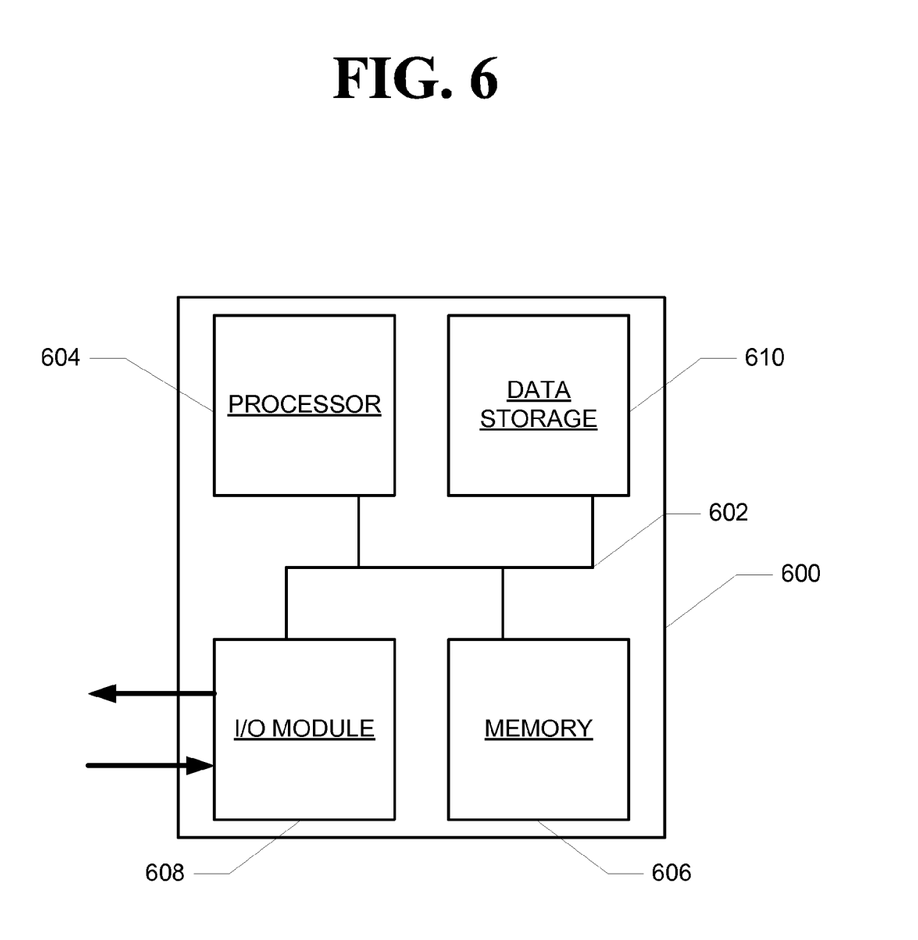
FIG. 6 is a block diagram illustrating a computer system with which certain aspects of the subject technology may be implemented.

FIG. 6 is a block diagram that illustrates a computer system 600 upon which an aspect may be implemented. Computer system 600 includes a bus 602 or other communication mechanism for communicating information, and a processor 604 coupled with bus 602 for processing information. Computer system 600 also includes a memory 606, such as a random access memory ("RAM") or other dynamic storage device, coupled to bus 602 for storing information and instructions to be executed by processor 604. Memory 606 may also be used for storing temporary variable or other intermediate information during execution of instructions to be executed by processor 604. Computer system 600 further includes a data storage device 610, such as a magnetic disk or optical disk, coupled to bus 602 for storing information and instructions.

Computer system 600 may be coupled via I/O module 608 to a display device (not illustrated), such as a cathode ray tube ("CRT") or liquid crystal display ("LCD") for displaying information to a computer user. An input device, such as, for example, a keyboard or a mouse may also be coupled to computer system 600 via I/O module 608 for communicating information and command selections to processor 604.

According to one aspect, interference suppression is performed by a computer system 600 in response to processor 604 executing one or more sequences of one or more instructions contained in memory 606. Such instructions may be read into memory 606 from another machine-readable medium, such as data storage device 610. Execution of the sequences of instructions contained in main memory 606 causes processor 604 to perform the process steps described herein. One or more processors in a multi-processing arrangement may also be employed to execute the sequences of instructions contained in memory 606. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 604 for execution. Such a medium may take many forms, including, but not limited to, non-volatile media, volatile media, and transmission media. Non-volatile media include, for example, optical or magnetic disks, such as data storage device 610. Volatile media include dynamic memory, such as memory 606. Transmission media include coaxial cables, copper wire, and fiber optics, including the wires that comprise bus 602. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for suppressing interference in a wireless communication, comprising the steps of:
   receiving a burst of symbols;
   generating a plurality of timing hypotheses for the burst of symbols;
   calculating a corresponding plurality of weights for each of the plurality of timing hypotheses based on a subset of the burst of symbols;
   filtering the subset of the burst of symbols using an interference suppression filter with the corresponding plurality of weights for each of the plurality of timing hypotheses;
   selecting one of the plurality of timing hypotheses based on a midamble estimation error of the selected timing hypothesis;
   filtering the burst of symbols using the interference suppression filter with a first plurality of weights corresponding to the selected timing hypothesis;
   decoding the filtered burst of symbols to generate data corresponding to the burst of symbols;
   encoding the data to generate a re-encoded burst of symbols;
   calculating a second plurality of weights for the interference suppression filter based upon the re-encoded burst of symbols;
   filtering the re-encoded burst of symbols using the interference suppression filter with the second plurality of weights; and
   decoding the filtered re-encoded burst of symbols.

2. The method of claim 1, wherein the midamble estimation error is calculated for each timing hypothesis of the plurality of timing hypotheses by:
   determining an estimated channel corresponding to the timing hypothesis;
   performing single antenna interference cancellation on the estimated channel to obtain an estimated midamble sequence; and
   comparing the estimated midamble sequence with a previously-known midamble sequence to determine the midamble estimation error.

3. The method of claim 2, wherein the determining the estimated channel corresponding to each symbol comprises selecting a number of adjacent symbols in the subset corresponding to a number of taps in the estimated channel.

4. The method of claim 1, wherein the generating the plurality of timing hypotheses comprises estimating a position of a first midamble symbol in the burst of symbols and selecting the subset of the burst of symbols from symbols centered around the estimated position.

5. The method of claim 1, wherein the corresponding plurality of weights for each timing hypothesis of the plurality of timing hypotheses is calculated by solving for $W_{SAIC} = \tilde{Z}[X]^\dagger$, where $\tilde{Z}$ is a vector corresponding to an estimate of the subset of the burst of symbols, and $[X]$ is a matrix of spatial temporal samples of the burst of symbols.

6. The method of claim 1, wherein the second plurality of weights is calculated by solving for $W_{SAIC} = \tilde{Z}[X]^\dagger$, where $\tilde{Z}$ is a vector corresponding to an estimate of the subset of the burst of symbols, and $[X]$ is a matrix of spatial temporal samples of the burst of symbols.

7. The method of claim 1, wherein the decoding the filtered burst of symbols includes performing error correction on the filtered burst of symbols.

8. The method of claim 1, wherein the interference suppression filter is a single antenna interference cancellation (SAIC) filter or a dual antenna interference cancellation (DAIC) filter.

9. The method of claim 1, wherein the interference suppression filter uses a higher-order model to filter the re-encoded burst of symbols than is used to filter the burst of symbols.

10. A receiver comprising:
   an antenna configured to receive a burst of symbols;
   a timing estimator configured to generate a plurality of timing hypotheses for the burst of symbols;
   a processor configured to calculate a corresponding plurality of weights for each of the plurality of timing hypotheses based on a subset of the burst of symbols;

an interference suppression filter configured to:
  filter the subset of the burst of symbols with the corresponding plurality of weights for each of the plurality of timing hypotheses; and
  filter the burst of symbols with a first plurality of weights corresponding to a selected timing hypothesis, wherein the processor is configured to select the selected timing hypothesis based on a midamble estimation error of the selected timing hypothesis;
a decoder configured to decode the filtered burst of symbols to generate data corresponding to the burst of symbols;
an encoder configured to encode the data to generate a re-encoded burst of symbols;
the processor configured to calculate a second plurality of weights for the interference suppression filter based upon the re-encoded burst of symbols;
the interference suppression filter configured to filter the re-encoded burst of symbols with the second plurality of weights; and
the decoder configured to decode the filtered re-encoded burst of symbols.

11. The receiver of claim 10, wherein the processor is configured to calculate the midamble estimation error for each timing hypothesis of the plurality of timing hypotheses by:
determining an estimated channel corresponding to the timing hypothesis;
performing single antenna interference cancellation on the estimated channel to obtain an estimated midamble sequence; and
comparing the estimated midamble sequence with a previously-known midamble sequence to determine the midamble estimation error.

12. The receiver of claim 11, wherein the determining the estimated channel corresponding to each symbol comprises selecting a number of adjacent symbols in the subset corresponding to a number of taps in the estimated channel.

13. The receiver of claim 10, wherein the timing estimator is configured to generate the plurality of timing hypotheses by estimating a position of a first midamble symbol in the burst of symbols and selecting the subset of the burst of symbols from symbols centered around the estimated position.

14. The receiver of claim 10, wherein the processor is configured to calculate the corresponding plurality of weights for each timing hypothesis of the plurality of timing hypotheses by solving for $W_{SAIC}=\tilde{Z}[X]^{\dagger}$, where $\tilde{Z}$ is a vector corresponding to an estimate of the subset of the burst of symbols, and $[X]$ is a matrix of spatial temporal samples of the burst of symbols.

15. The receiver of claim 10, wherein the processor is configured to calculate the second plurality of weights by solving for $W_{SAIC}=\tilde{Z}[X]^{\dagger}$, where $\tilde{Z}$ is a vector corresponding to an estimate of the subset of the burst of symbols, and $[X]$ is a matrix of spatial temporal samples of the burst of symbols.

16. The receiver of claim 10, wherein the decoding the filtered burst of symbols includes performing error correction on the filtered burst of symbols.

17. The receiver of claim 10, wherein the interference suppression filter is a single antenna interference cancellation (SAIC) filter or a dual antenna interference cancellation (DAIC) filter.

18. The receiver of claim 10, wherein the interference suppression filter is configured to use a higher-order model to filter the re-encoded burst of symbols than is used to filter the burst of symbols.

19. A receiver comprising:
means for receiving a burst of symbols;
means for generating a plurality of timing hypotheses for the burst of symbols;
means for calculating for each timing hypothesis of the plurality of timing hypotheses, a corresponding plurality of weights for an interference suppression means based upon a subset of the burst of symbols, the interference suppression means for filtering, for each timing hypothesis of the plurality of timing hypotheses, the subset of the burst of symbols with the corresponding plurality of weights;
means for selecting a selected timing hypothesis of the plurality of timing hypotheses based on a selection criteria, wherein the selected timing hypothesis corresponds to a first plurality of weights, the interference suppression means for filtering the burst of symbols with the first plurality of weights;
decoding means for decoding the filtered burst of symbols to generate data corresponding to the burst of symbols;
means for encoding the data to generate a re-encoded burst of symbols; and
means for calculating a second plurality of weights for the interference suppression means based upon the re-encoded burst of symbols, the interference suppression means for filtering the re-encoded burst of symbols with the second plurality of weights, and the decoding means for decoding the filtered re-encoded burst of symbols.

20. The receiver of claim 19, wherein the selection criteria is a midamble estimation error.

21. The receiver of claim 20, wherein the means for calculating the midamble estimation error for each timing hypothesis of the plurality of timing hypotheses comprises:
means for determining an estimated channel corresponding to the timing hypothesis;
means for performing single antenna interference cancellation on the estimated channel to obtain an estimated midamble sequence; and
means for comparing the estimated midamble sequence with a previously-known midamble sequence to determine the midamble estimation error.

22. The receiver of claim 21, wherein the means for determining the estimated channel corresponding to each symbol comprises means for selecting a predetermined number of adjacent symbols in the subset corresponding to a number of taps in the estimated channel.

23. The receiver of claim 19, wherein the means for generating the plurality of timing hypotheses comprises means for estimating a position of a first midamble symbol in the burst of symbols and means for selecting the subset of the burst of symbols from symbols centered around the estimated position.

24. The receiver of claim 19, wherein the means for calculating the first plurality of weights for each timing hypothesis of the plurality of timing hypotheses comprises means for solving for $W_{SAIC}=\tilde{Z}[X]^{\dagger}$, where $\tilde{Z}$ is a vector corresponding to an estimate of the subset of the burst of symbols, and $[X]$ is a matrix of spatial temporal samples of the burst of symbols.

25. The receiver of claim 19, wherein the means for calculating the second plurality of weights comprises means for solving for $W_{SAIC}=\tilde{Z}[X]^{\dagger}$, where $\tilde{Z}$ is a vector corresponding to an estimate of the subset of the burst of symbols, and $[X]$ is a matrix of spatial temporal samples of the burst of symbols.

26. The receiver of claim 19, wherein the decoding means for decoding the filtered burst of symbols includes means for performing error correction on the filtered burst of symbols.

27. The receiver of claim 19, wherein the interference suppression means comprises a single antenna interference cancellation (SAIC) filter or a dual antenna interference cancellation (DAIC) filter.

28. The receiver of claim 19, wherein the interference suppression means is configured to use a higher-order model to filter the re-encoded burst of symbols than is used to filter the burst of symbols.

29. A non-transitory machine-readable medium comprising instructions for suppressing interference in a wireless communication, the instructions comprising code for:
receiving a burst of symbols;
generating a plurality of timing hypotheses for the burst of symbols;
calculating a corresponding plurality of weights for each of the plurality of timing hypotheses based on a subset of the burst of symbols;
filtering the subset of the burst of symbols using the interference suppression filter with the corresponding plurality of weights for each of the plurality of timing hypotheses;
selecting one of the plurality of timing hypotheses based on a midamble estimation error of the selected timing hypothesis;
filtering the burst of symbols using the interference suppression filter with a first plurality of weights corresponding to the selected timing hypothesis;
decoding the filtered burst of symbols to generate data corresponding to the burst of symbols;
encoding the data to generate a re-encoded burst of symbols;
calculating a second plurality of weights for the interference suppression filter based upon the re-encoded burst of symbols;
filtering the re-encoded burst of symbols using the interference suppression filter with the second plurality of weights; and
decoding the filtered re-encoded burst of symbols.

30. The non-transitory machine-readable medium of claim 29, wherein the midamble estimation error is calculated for each timing hypothesis of the plurality of timing hypotheses by:
determining an estimated channel corresponding to the timing hypothesis;
performing single antenna interference cancellation on the estimated channel to obtain an estimated midamble sequence; and
comparing the estimated midamble sequence with a previously-known midamble sequence to determine the midamble estimation error.

31. The non-transitory machine-readable medium of claim 30, wherein the determining the estimated channel corresponding to each symbol comprises selecting a number of adjacent symbols in the subset corresponding to a number of taps in the estimated channel.

32. The non-transitory machine-readable medium of claim 29, wherein the generating the plurality of timing hypotheses comprises estimating a position of a first midamble symbol in the burst of symbols and selecting the subset of the burst of symbols from symbols centered around the estimated position.

33. The non-transitory machine-readable medium of claim 29, wherein the corresponding plurality of weights for each timing hypothesis of the plurality of timing hypotheses is calculated by solving for $W_{SAIC}=\tilde{Z}[X]^\dagger$, where $\tilde{Z}$ is a vector corresponding to an estimate of the subset of the burst of symbols, and $[X]$ is a matrix of spatial temporal samples of the burst of symbols.

34. The non-transitory machine-readable medium of claim 29, wherein the second plurality of weights is calculated by solving for $W_{SAIC}=\tilde{Z}[X]^\dagger$, where $\tilde{Z}$ is a vector corresponding to an estimate of the subset of the burst of symbols, and $[X]$ is a matrix of spatial temporal samples of the burst of symbols.

35. The non-transitory machine-readable medium of claim 29, wherein the decoding the filtered burst of symbols includes performing error correction on the filtered burst of symbols.

36. The non-transitory machine-readable medium of claim 29, wherein the interference suppression filter is a single antenna interference cancellation (SAIC) filter or a dual antenna interference cancellation (DAIC) filter.

37. The non-transitory machine-readable medium of claim 29, wherein the interference suppression filter is configured to use a higher-order model to filter the re-encoded burst of symbols than is used to filter the burst of symbols.

\* \* \* \* \*